W. H. PENSEYRES.
NON-SLIPPING TRACTION DEVICE FOR VEHICLE WHEELS.
APPLICATION FILED FEB. 17, 1912.

1,213,131.

Patented Jan. 16, 1917.

WITNESSES:

INVENTOR
William H. Penseyres,
by his attorney

UNITED STATES PATENT OFFICE.

WILLIAM H. PENSEYRES, OF BUFFALO, NEW YORK.

NON-SLIPPING TRACTION DEVICE FOR VEHICLE-WHEELS.

1,213,131.  Specification of Letters Patent. Patented Jan. 16, 1917.

Application filed February 17, 1912. Serial No. 678,396.

*To all whom it may concern:*

Be it known that I, WILLIAM H. PENSEYRES, a citizen of the United States, residing at Buffalo, in the county of Erie and State of New York, have invented certain new and useful Improvements in Non-Slipping Traction Devices for Vehicle-Wheels; and I do hereby declare the following to be a full, clear, and exact description of my invention, such as will enable others skilled in the art to which it appertains to make and use the same, reference being had to the accompanying drawings, and to figures of reference marked thereon, which form part of this specification.

Like figures of reference refer to like parts.

My invention relates to auxiliary devices adapted to be mounted upon a tire of a vehicle wheel to cause the same to resist slipping on a slippery road.

The objects of my invention are to provide means which are adapted to act between the road and the tread of said tire to prevent slipping therebetween, and which are adapted when so acting to firmly grip the said tire at several points at the same time around the periphery and to free itself and change its position about said tire when not in action to prevent slipping and thus distribute the wear on said tire between it and the said device, when acting at the changed position. To attain the said objects, I provide certain details of construction, which are illustrated in the accompanying drawings and are hereinafter described; their coöperation is explained and what I claim is set forth.

Figures 1, 3:
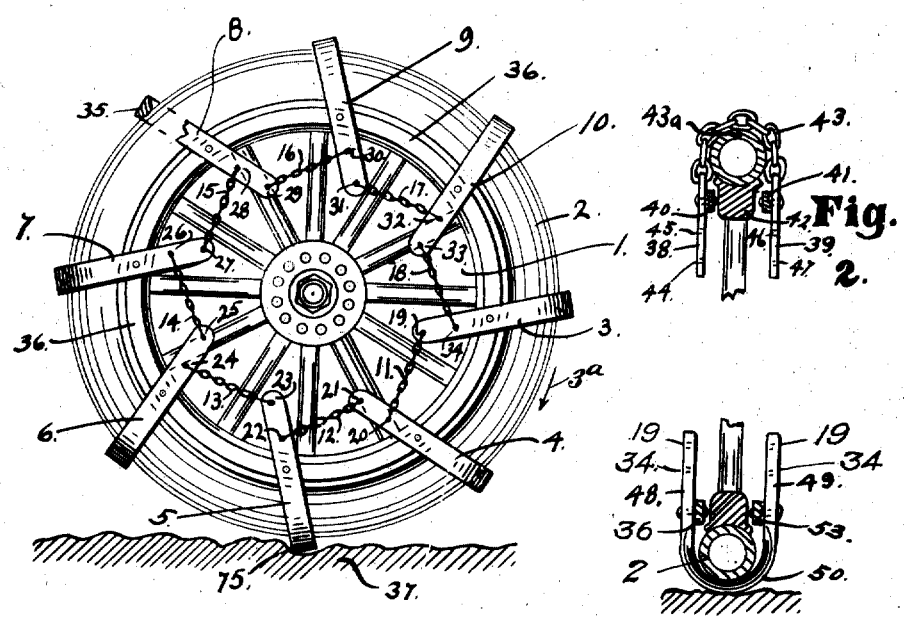
Figures 4, 5:
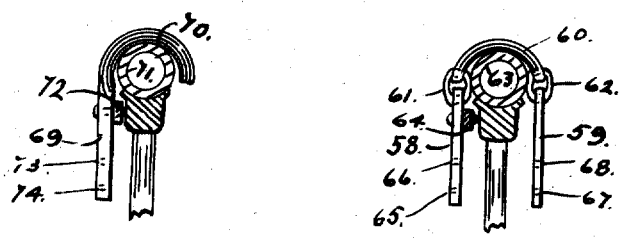
Figure 6:
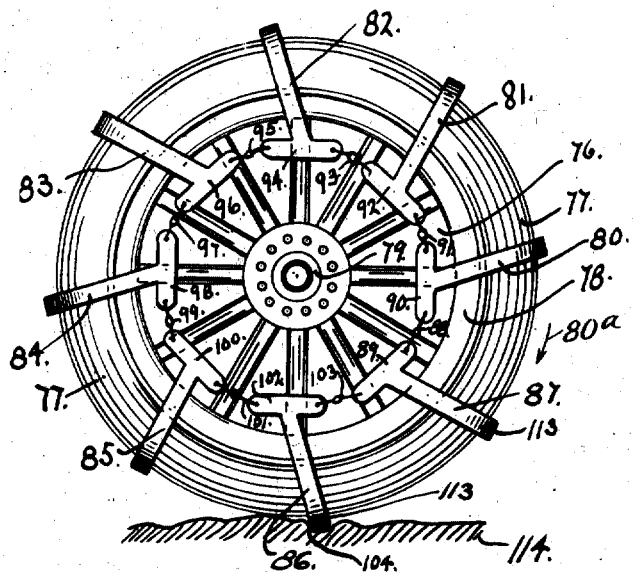

In Figure 1 of the drawings, is shown a vehicle wheel with a rubber tire, upon which is mounted a form of my device. Some modifications of parts of my device are shown in Figs. 2, 3, 4, 5, 7 and 8 and are hereinafter described. Fig. 6 shows an assembled modification of my device differing in detail but not in function from the form shown in Fig. 1.

Referring to Fig. 1, 1 is a vehicle wheel having a tire 2, upon which are mounted eight members of my device marked respectively 3, 4, 5, 6, 7, 8, 9, and 10. Each of said members shown in this figure is U-shaped, having approximately parallel lever portions, one on each side of the said wheel, and a curved portion between them in contact with the tread of the tire of said wheel and partially surrounding the said tire. Views of three varieties of members are shown in Figs. 2, 3, and 4. Referring to other parts of my invention shown in Fig. 1, 11 is a chain connecting the bar or lever portion of the member 3 with the bar or lever portion of the member 4 on the same side of the wheel, said chain being journaled at its ends upon said bar or lever portions respectively. Similarly, the chain 12 connects 4 and 5; the chain 13 connects 5 and 6; the chain 14 connects 6 and 7; the chain 15 connects 7 and 8; the chain 16 connects 8 and 9; the chain 17 connects 9 and 10; the chain 18 connects 10 and 3. In each of the said connections the chain joins a point near the inner end of one bar with a point away from the end of the next bar, as from 19 to 20, 21 to 22, 23 to 24, 25 to 26, 27 to 28, 29 to 30, 31 to 32, 33 to 34. The bar portions of the members on the opposite side of the wheel are similarly connected by chains, but not shown. The member 8 is shown partially broken away to illustrate the sectional contour of the inner round portion of this member at 35. All members are shown pivoted each to a loose ring 36. Similarly, but not shown, the said members are pivoted to a like ring on the opposite side of the wheel 1. The said wheel is shown in a position having the curved portion of the member 5 in contact with a road section 37.

In Fig. 2, the two bar portions, 38 and 39 of a modified form of member are pivoted respectively to the sections of rings 40 and 41 on either side of the wheel rim 42. 38 and 39 are connected by the chain curved portion of this member marked 4ª in contact with the tire section 43ª. Two holes 44 and 45 are provided in the bar portion 38 for the journaling of chains connecting neighboring members, and similarly placed holes, 46 and 47, are provided in the bar portion 39.

One of the members 3, 4, 5, 6, 7, 8, 9 and 10 is shown in a different view in Fig. 3, wherein the straight bar portions 48 and 49 are integral with the curved portion 50, which is in contact with the tire section 2. 36 is a ring section to which 48 is pivoted and 53 is another ring section having pivoted thereto the bar portion 49. 19 and 34 are holes in the bar or lever portions of the member shown in this figure and are provided for the journaling of chains or like connections which are adapted to join neighboring members of a plurality of the same positioned about the tire of a vehicle wheel in the manner shown in Fig. 1.

In Fig. 4, the bar portions, marked 58 and 59, are connected respectively to the curved portion 60 by the links 61 and 62. The curved portion 60 is in contact with the tire section 63. Only one ring section is shown and is marked 64. It is pivoted to the bar portion 58.

It is not necessary to use a ring, as above described as pivoted to the separate members, for the purpose of the operation of my device, but there is some advantage in using such a ring on one or both sides of said wheel as desired. The ring, herein referred to, may be made flexible and in link form as a chain if desired. And another modification of attaching the members may be had by having each of said members journaled on pivots which are fast in the rim of said wheel. Such pivots would be positioned relative to the members about where pivots are now shown in Fig. 1 at the crossing of the said members with the ring 36, and the holes in which pivots projecting from the rim of said wheel, are journaled in the said members may be elongated in shape, transverse to the said rim. The inner ends of the bar portions of said members in all forms of my invention are connected by chains or the like. For the journaling of such chain connections, holes marked 65, 66, 67, 68 are provided in the bar portions of members of the type shown in Fig. 4. Such chain connections being provided between like members of a plurality of the same mounted on a tire.

In Fig. 5, I have shown a member having only one bar portion as at 69 integral with a curved portion 70 of said member, crossing over and in contact with the tire section 71. The bar portion 69 is illustrated as pivoted to a ring section 72. Holes 73 and 74 are provided for the journaling of chain connections or the like between neighboring bar or lever portions of a plurality of such members about the tire of a wheel.

Figure 7:
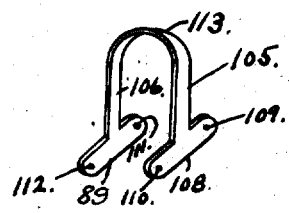

In Fig. 6, is illustrated a modification of the inner ends of the bar portions of members shown in Fig. 1. Upon the wheel 76 are mounted eight members marked respectively 80, 81, 82, 83, 84, 85, 86, and 87. 77 is a tire mounted upon the wheel 76, the rim of which wheel is marked 78. 79 is the hub of said wheel 76. A chain 88 connects the T part 89 of the member 87 with the T part 90 of the member 80. Similarly 91 connects 90 with 92; 93 connects 92 with 94; 95 connects 94 with 96; 97 connects 96 with 98; 99 connects 98 with 100; 101 connects 100 with 102; 103 connects 102 with 89 completing the continuous connections of all the T parts of this type of members. In Fig. 7, I have shown another view of one of the like members 80, 81, 84, 85, 86, and 87, wherein bar portions of said member are numbered 105 and 106. 106 terminates in a cross-bar 89 with which it forms a T. Similarly, 105 terminates in a cross-bar 108. Holes 109, 110, 111, 112 are provided in said cross-bars for the journaling of chain like connections, as 88, 91, 93, 95 of Fig. 6. 113 is a curved portion continuous with the bar portions 105 and 106.

Figure 8:
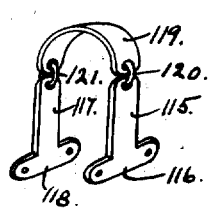

In Fig. 8, I have shown a modification of the member 82 shown in Fig. 7. 115 and 117 are bar portions of the member shown in Fig. 8. 116 and 118 are respectively cross-bars in which 115 and 117 terminate. A curved portion 119 of this member is shown loosely linked by the link 120 to the portion 115, and by the link 121 to the portion 117.

Having described some modifications of the members of my invention, in each case a bar portion, a curved portion or its equivalent, and chain like connections between the inner ends of said bar portions positioned between the tread of the tire and the hub of the vehicle wheel are essential elements for coöperation in fulfilling the objects of my invention. The question of having the bar portions in a plurality of like members provided only on one side of the said wheel or on both sides is a matter of choice and is determined in design by the strength of said device or invention required for the conditions of continuous and successful operation.

In operation, in either of the forms of my device shown in Figs. 1 and 6, a tilting motion of a member in contact with a road is produced by a clock-wise movement of said wheel, shown in direction by the respective arrows, 3ª and 80ª. This tilting motion causes a shortening of the chain connections referred to above and is attended by some tilting action in each of the other members which results in a binding of the curved portions of said members upon their respective tire treads, causing the said members to act integrally with the said wheel in each case, giving firmness to the member in contact with the road and causing the same resistance between the tread of said tire and a slippery road. In the case shown in Fig. 1, the member 5, shown in contact with the road section 37, is caused, by a clock-wise movement of the wheel 1, to rock to the left on the point of contact 75. This movement of the member 5 causes the chain 12 to cant the member 4, which likewise, through the chain 11 cants the member 3 and so on for each member and chain connections, whereby each member is caused to cant and there results a movement, caused by the closing in of all the members upon the tread of the tire of the wheel, which binds all members thereon and gives firmness to the member between the tire and the road section 37 giving the desired resistance to the point of contact 75 on a slippery road and concentrated pressure at the said point of contact. When the road is not slippery and the tire finds sufficient friction thereon, the device is loose upon said tire and in the rotation of the wheel it shifts circumferentially thereon. Some shifting takes place also as one member leaves the road and another comes in contact therewith.

In operation, referring to Fig. 6, the member 86 is caused, by a clock-wise movement of the wheel 76, to cant to the left on the point of contact 104, on the road section 114. This rocks the cross-bar 102, causing a tension in the chains 101 and 103 and a consequent shortening in the continuous connection, made up of the said cross-bars and intermediate chain connections, takes place which draws all members inwardly, resulting in a binding action between the curved portions of said members and the tread of the tire 77, and makes the device act integrally with the said wheel 76, giving firmness to the member 86, whereby a point of concentrated pressure is located in a fixed position on said tire 77 and prevents the slipping of the same on the road. The shifting action circumferentially upon the tire in this case may take place under the circumstances described for the form of device illustrated in Fig. 1, in connection with the members.

Having described my invention, I claim

1. In a non-slipping traction device for vehicle wheels, the combination with a plurality of members positioned transverse to and in contact with the tire of said wheel, of chain connections journaled on inner portions of said members in continuous connection, each of said members having a curved portion in contact with said tire, and a bar or lever portion positioned between the tire of said wheel and the hub of the same, said chain connections being journaled to join a point near the inner end of said bar portion of one member with the bar portion of a neighboring member at a point away from the end of the same, and all neighboring members being similarly connected.

2. In a non-slipping traction device for vehicle wheels, the combination with a plurality of members positioned transverse to and in contact with the tire of said wheel, of chain connections journaled on the inner portions of said members in continuous connection, each of said members having a curved portion in contact with said tire, and a bar or lever portion positioned between the tire of said wheel and the hub of the same, said chain connections being journaled to join a point near the inner end of said bar portion of one member with the bar portion of a neighboring member at a point away from the end of the same, and all neighboring members being similarly connected, and a ring positioned near said tire concentric with the same and having pivoted thereto each of said members substantially as set forth.

3. A device of the class described, comprising the combination of a plurality of like members, spaced circumferentially about the tire of a vehicle wheel and transverse to said tire and having each an inwardly positioned bar extension, chain-like connections continuously joining the said bar extensions and a ring positioned near said tire and having pivoted thereto each of the said members.

4. A non-slipping traction device, adapted to be mounted upon a vehicle wheel, comprising a plurality of similar members spaced circumferentially about the tire of said wheel and transverse to said tire, each of said members having an inwardly positioned bar extension, means connecting the inner ends of neighboring bar extensions, said means being journaled at two separate points upon each of said inner ends, and a ring positioned near said tire and having pivoted thereto each of said members, substantially as set forth.

5. A non-slipping traction device, adapted to be mounted upon the tire of a vehicle wheel, comprising a plurality of members spaced circumferentially upon and transverse to the tractive surface of said tire, each member having a lever portion extending toward the hub of said wheel, the normal longitudinal direction of said lever portion being inclined to a radius of said wheel passing through the central point of contact of the member, of which said lever portion is a part, and the said tire, said lever portions being linked together for their coaction in a manner to produce a gripping of said tractive surface by said device, when one of said lever portions is tilted by the retarding action of its member with the ground.

WILLIAM H. PENSEYRES.

Witnesses:
CLARENCE U. CARRUTH,
J. EDW. THIEBAUD.